(12) United States Patent
Schlipf et al.

(10) Patent No.: US 12,534,184 B2
(45) Date of Patent: Jan. 27, 2026

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/770,141

(22) Filed: Jul. 11, 2024

(65) Prior Publication Data

US 2025/0019063 A1 Jan. 16, 2025

(30) Foreign Application Priority Data

Jul. 12, 2023 (EP) ..................................... 23185095

(51) Int. Cl.
*B64C 9/02* (2006.01)
*B64C 13/28* (2006.01)

(52) U.S. Cl.
CPC ................ *B64C 9/02* (2013.01); *B64C 13/28* (2013.01)

(58) Field of Classification Search
CPC ..... B64C 9/02; B64C 9/22; B64C 9/24; F16C 13/06; F16C 13/02
See application file for complete search history.

(56) References Cited

U.S. PATENT DOCUMENTS

| | | | |
|---|---|---|---|
| 2,405,726 A * | 8/1946 | Zap ........................... | B64C 9/16 244/216 |
| 10,283,312 B2 * | 5/2019 | McCabe ............. | H01J 35/1017 |
| 2004/0140708 A1 | 7/2004 | Bott et al. | |
| 2006/0042459 A1 * | 3/2006 | Pecorari .................... | F01B 9/06 91/491 |
| 2010/0187367 A1 | 7/2010 | Dahl | |
| 2014/0140646 A1 * | 5/2014 | Porter ................... | F16C 23/045 384/202 |
| 2019/0383358 A1 * | 12/2019 | Onoda .................... | F16H 55/24 |

(Continued)

FOREIGN PATENT DOCUMENTS

PL 202514 B1 7/2009

OTHER PUBLICATIONS

Extended European Search Report including Written Opinion for Application No. 23185095.9 dated Dec. 19, 2023, pp. 1-7.

*Primary Examiner* — Magdalena Topolski
*Assistant Examiner* — Shanna Danielle Glover
(74) *Attorney, Agent, or Firm* — Lerner David LLP

(57) ABSTRACT

An aircraft wing includes a main wing and a high lift assembly having a high lift body and a connection assembly movably connecting the high lift body to the main wing, such that the high lift body is movable between retracted and extended positions. The connection assembly includes an elongate track extending along a longitudinal axis between first and second ends and has an intermediate portion. The first end is mounted to the high lift body, and the second end is mounted to the main wing by a roller bearing such that the track is movable along the longitudinal axis. The roller bearing includes a roller unit mounted to the main wing and having a circumferential roller surface engaging an engagement surface of the track and an internal elastic bearing allowing the roller surface, in a cross section parallel to the roller rotation axis, to adapt its orientation or form.

17 Claims, 7 Drawing Sheets

(56) References Cited

U.S. PATENT DOCUMENTS

2020/0122819 A1\* 4/2020 Schlipf .................... B64C 9/24
2020/0307769 A1 10/2020 Lorenz et al.
2021/0284320 A1 9/2021 Bauer et al.

\* cited by examiner

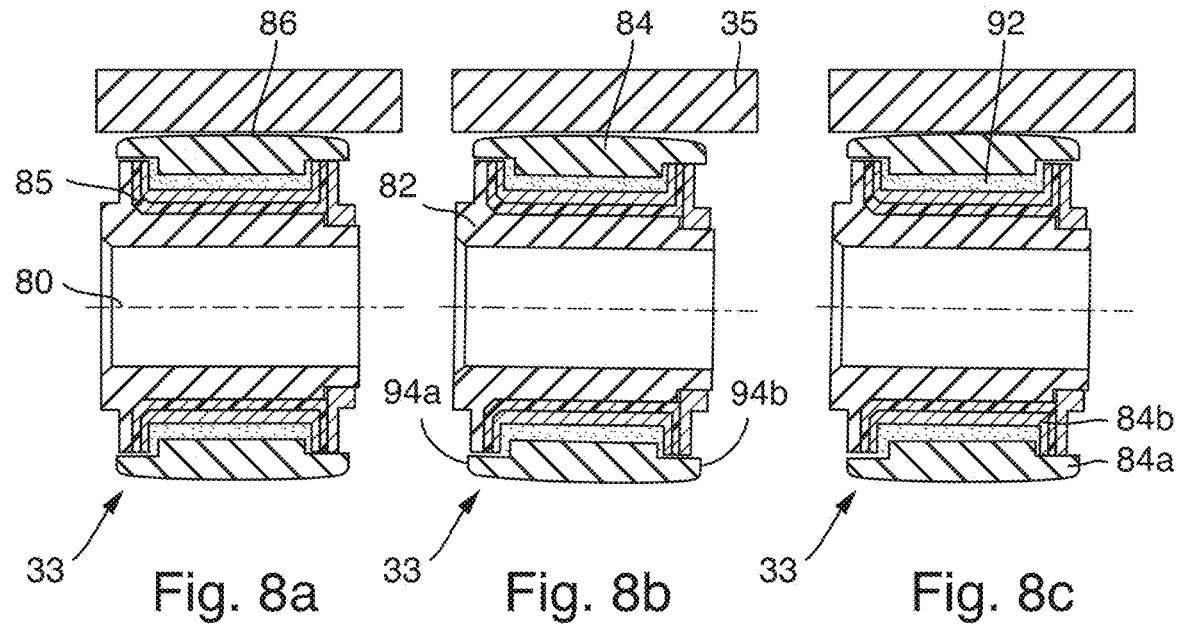
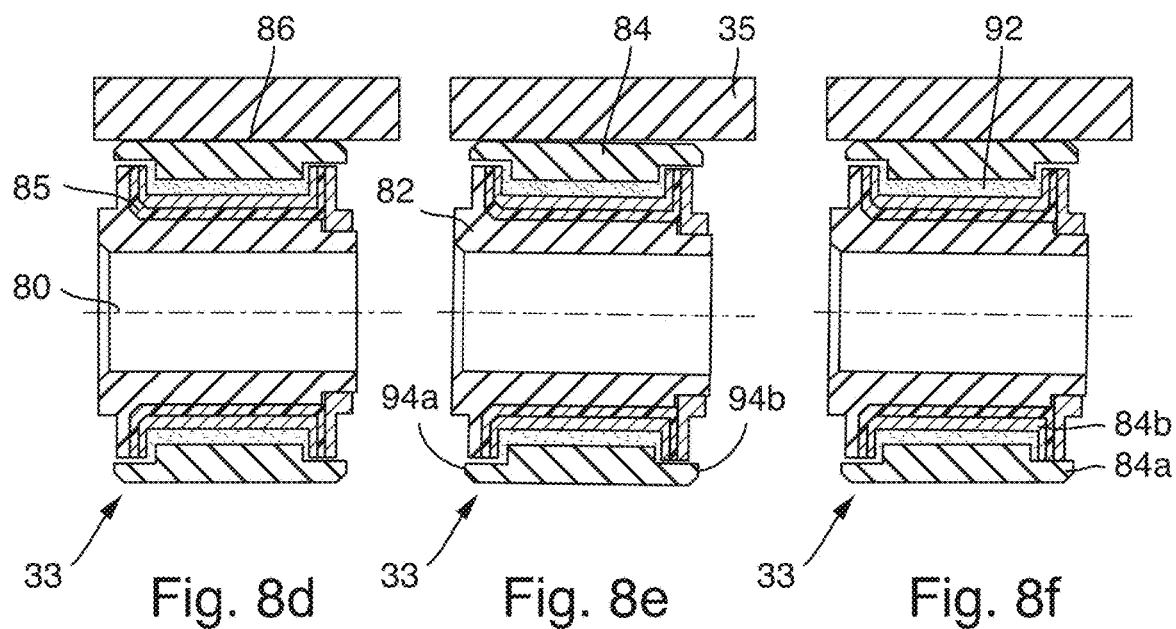

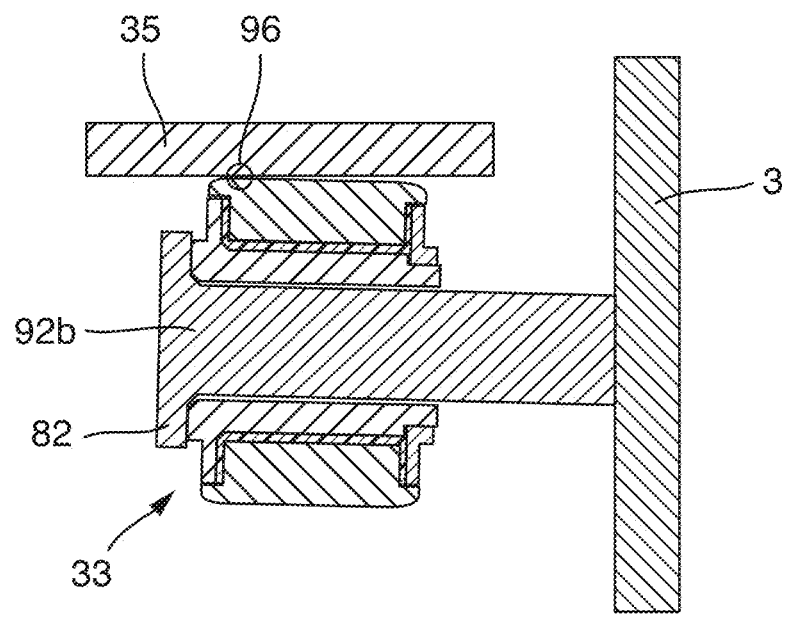
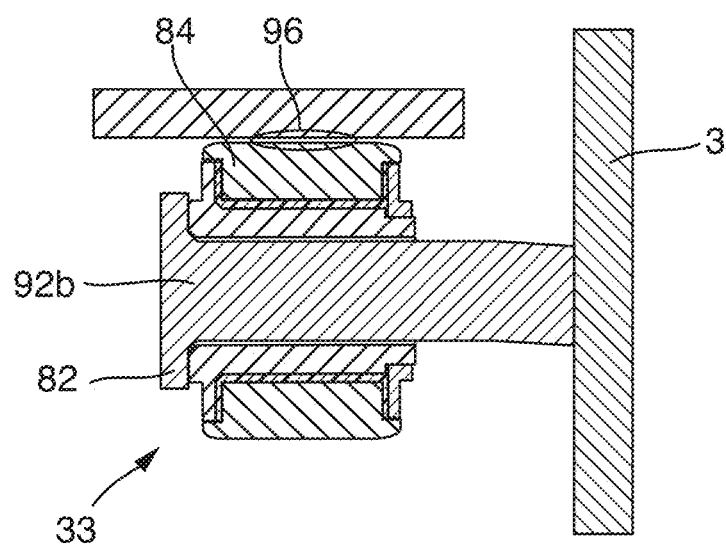
Fig. 10

WING FOR AN AIRCRAFT

FIELD OF THE INVENTION

The present invention relates to a wing for an aircraft, a high lift assembly and a roller unit associated with said wing, and an aircraft comprising said wing.

BACKGROUND OF THE INVENTION

The described wing for an aircraft comprises a main wing and a high lift assembly, the high lift assembly comprising a high lift body and a connection assembly movably connecting the high lift body to the main wing such that the high lift body is movable between a retracted position and at least one extended position (e.g. movable relative to the main wing). The high lift body may be or comprise a leading edge slat or a trailing edge flap of a wing for an aircraft.

The connection assembly comprises an elongate track that extends along a track longitudinal axis between a first end and a second end and has an intermediate portion between the first and second ends. At least one, or both, of the first end and the intermediate portion of the elongate track is/are mounted to the high lift body.

The first end may correspond to a front end of the connection assembly, e.g. the end positioned towards the intended direction of forward motion of the wing during flight of an aircraft. Alternatively, the first end may correspond to a rear end of the connection assembly, e.g. the end positioned aware from the intended direction of forward motion of the wind during flight of an aircraft. Where the high lift body is or comprises a leading edge slat, then the first end may correspond to the front end of the connection assembly. Where the high lift body is or comprises a trailing edge flap, then the first end may correspond to the rear end of the connection assembly.

The first end of the elongate track may be preferably mounted to either a leading edge slat, or to a trailing edge flap by any appropriate means, e.g. by a spherical bearing or bearings. The second end of the elongate track may be preferably mounted to the main wing by a roller bearing, as will be described, such that the elongate track and either the leading edge slat or the trailing edge flap are moveable relative to the main wing. The elongate track may take the form of, for example, a C-shape, such that its surface lies opposite the circumferential surface of the roller bearing, wherein the distance between an upper surface and a lower surface of the elongate track is larger than a diameter of a roller bearing, such that the roller bearing may engage only one of the upper surface or the lower surface of the elongate track at any one time. I.e. the distance between the upper and lower surfaces of the elongate track is selected such that a clearance is provided between the roller bearing and either the upper surface or the lower surface of the elongate track, such that the roller bearing cannot engage with the upper and lower surfaces of the elongate track at the same time, thereby becoming wedged therein.

At least one of the second end and the intermediate portion of the track is mounted to the main wing by a roller bearing such that the track is movable along the track longitudinal axis, for example along a predefined path e.g. on the track longitudinal axis, such as between a stowed position in which the high lift body is in the retracted position and a deployed position in which the high lift body is in one of the at least one extended positions.

The roller bearing comprises at least one roller unit that is mounted to the main wing and is rotatable about a roller rotation axis. Additionally, the roller bearing comprises a circumferential roller surface that engages an engagement surface provided on the elongate track. Preferably, the engagement surface may be provided on the intermediate portion and/or the second end of the elongate track. The roller unit may be mounted to the main wing in any appropriate way, for example may be fixed or fastened to the main wing, for example may be bolted to the main wing.

Wings for aircraft having connection assemblies that movably connect a high lift body to the main wing are known to comprise roller bearings. In an ideal scenario, a conventional roller bearing would be provided to enable rolling movement of the high lift body relative to the wings of an aircraft, via a connection assembly. A conventional roller bearing may be generally cylindrical in shape and may comprise a curved roller surface that is defined by a constant diameter along the length of the roller bearing. Ideally loaded, the roller surface of the conventional roller forms an elongated shaped contact region between the roller bearing an engagement surface, with the loading distributed evenly along this contact region. However, in cases of angular misalignment between the axis of the roller and the engagement surface, the length of the contact region may be significantly reduced, possibly even to a point load, resulting in large stress concentrations in the contact region. This can result in the damaging of one or both of the roller bearing and the engagement surface.

BRIEF SUMMARY OF THE INVENTION

One possible way to avoid this problem is to use a crowned roller bearing, where the diameter of the roller bearing is variable along its length, such that the roller surface is convex in shape in the longitudinal direction of the bearing, the convex surface having predetermined constant radius along the length thereof. The user of a crowned roller bearing means that small alignments of the axis of the roller bearing relative to an engagement surface still enable normal, or at least functional engagement of the roller bearing with the engagement surface. However, this solution has the drawback that the contact region between the bearing and an engagement surface is still severely limited in size. This solution therefore assists to avoid point loading, but still results in a reasonable degree of stress concentration in the contact region. Thus, over time such bearings can still result in damage to either the roller bearing or the engagement surface. There is therefore a need in the art to provide a roller bearing that may be used to provide or facilitate movement between an aircraft wing and a high lift assembly in conditions in which the bearing rotation axis is angularly misaligned relative to the engagement surface, so as to avoid damage to either the roller bearing or the engagement surface.

Therefore, an aspect relates to providing a simple, lightweight and low maintenance design of a wing and associated high lift assembly and roller unit.

According to an embodiment, the roller unit comprises an internal elastic bearing that allows the roller surface, when viewed in a cross section parallel to the roller rotation axis, to adapt its orientation or form. For example the internal elastic bearing may allow reorientation of the roller surface relative to the roller rotation axis, such as a change in the angle of the roller surface relative to the roller rotation axis. Where the roller surface is in the form of a straight line in the longitudinal direction, the elastic bearing may allow reorientation of this surface away from, or towards, a parallel orientation with the roller rotation axis. Where the roller surface has a curved form, the elastic bearing may allow reorientation of the angle of the curve relative to the roller rotation axis so as to effect a change in the section of the curved surface held parallel to the roller rotation axis. E.g. a section of the curve positioned longitudinally centrally on the curved surface may be reoriented from being parallel to the roller rotation axis to being held at an angle relative to the roller rotation axis.

The internal elastic bearing may be in the form of an elastomeric bearing. Additionally, the roller unit may comprise a radially outer portion and a radially inner portion, wherein the elastic bearing may be arranged between the radially outer and inner portions, so that the radially outer portion can be tilted about a tilt axis perpendicular to the roller rotation axis. Tilting of the radially outer portion may be in a longitudinal direction. Tilting may therefore be in a sense when viewed in a cross-section parallel to the roller rotation axis. This configuration may therefore assist to adapt the orientation of the roller surface to the orientation of the elongate track during engagement therebetween. Thus, a greater contact region in use may be provided.

According to a preferred embodiment, the roller surface, when viewed in a cross-section parallel to the roller rotation axis, may have a form that is convexly curved in such a way that from the lateral edges towards the centre of the roller surface the curvature radius increases continuously. Thus, the contact region between the roller surface and an engagement surface is increased, in particular the contact region between the roller surface and engagement surface may increase as the curvature radius at the contact region increases.

The roller surface may have a convexly curved form that is without kinks, for example that is smooth and/or that is without abrupt changes in geometry resulting in ribs, dimples, or the like. The curvature radius may increase continuously to infinity, i.e. such that the roller surface is flat and/or parallel to the roller rotation axis.

According to a preferred embodiment, the connection assembly may be a first connection assembly, and the wing may comprise a second connection assembly that connects the high lift body to the main wing in a position spaced apart from the first connection assembly in a direction along the span of the wing (e.g. in a wing span direction), where the second connection assembly is formed as the first connection assembly, e.g. where the second connection assembly is geometrically identical to the first connection assembly, and/or comprises the same structure as the first connection assembly.

According to a preferred embodiment, the roller surface may, when viewed in a cross-section parallel to the roller rotation axis, be convexly curved in such a way that the curvature radius increases continuously from the lateral edges to (e.g. up to, until) the centre of the roller surface. In an alternative embodiment the roller surface may, when viewed in a cross-section parallel to the roller rotation axis, be convexly curved in such a way that the curvature radius increases from the lateral edges to (e.g. up to, until) an even section with no curvature, the even section beginning laterally of the centre of (e.g. offset from) the roller surface. In some examples, the even section with no curvature may provide a region having an infinitely large curvature radius, e.g. a surface extending parallel to the roller rotation axis, which may be considered to be a flat surface. Having such a geometry may assist to provide a force urging the roller unit into an orientation in which the roller surface is adapted towards the orientation of the elongate track i.e. the contact region may move towards the centre of the roller surface, and thereby may assist to provide a larger contact region when in use.

In some embodiments, the roller surface may, when viewed in a cross-section parallel to the roller rotation axis, be a straight line, and may be parallel to the roller rotation axis. In such examples, the diameter of the roller bearing may be constant along its length, or may be substantially constant along its length, not counting details such as chamfers occurring at an edge thereof.

In one embodiment, the roller unit may comprise a static part and a movable part, wherein the static part may be formed as or comprise a shaft mounted to the main wing, and wherein the movable part may be formed as or comprise a sleeve arranged rotatably around the shaft. The shaft may be fixedly mounted to the main wing. The moveable part may comprise the radially outer portion and the radially inner portion.

The movable part may be rotatably supported around the static part by a low friction liner arranged between the static part and the radially inner portion of the movable part. The low friction liner may be in the form of a slide pad, a roller bearing, a lubricant, or the like. The elastic bearing may be formed by the roller unit comprising one or more slots provided in the movable part. Preferably, the one or more slots provided in the moveable part may be provided in parallel to the roller rotation axis. The static part may be or comprise the elastic bearing. In particular, the static part may be or comprise a shaft that is elastically deformable, in particular bendable, along its longitudinal axis, thereby adjusting the tilt position of the roller unit.

The roller unit may be a first roller unit and the roller bearing may comprise a second roller unit spaced from the first roller unit along the track longitudinal axis. The second roller unit may be formed as the first roller unit (e.g. the second roller unit may be geometrically identical, and/or may have a similar or identical structure to the first roller unit). Alternatively, the second roller unit may be mounted to the end of the elongate track and may engage a guide rail mounted to the main wing, for example such that the second roller is not in contact with an engagement surface, or not always in contact with an engagement surface.

The track may have a profile which may comprise an upper flange portion, a lower flange portion and at least one web portion connecting upper and lower flange portions. The roller unit may be arranged in a recess between upper and lower flange portions and may engage the engagement surface provided at the upper flange portion and/or at the lower flange portion.

The track may have a profile in which a first recess is formed between the upper and lower flange portions at a first side of the web portion, and may have a second recess which is formed between the upper and lower flange portions at a second side of the web portion, where the second side may be opposite the first side. The profile of the track may be or take the form of, for example, an I, Π, double-C, or double-T, thereby providing the first and second recesses.

Preferably, the roller unit may comprise a first roller element and a second roller element. The first roller element may be arranged in the first recess and the second roller element may be arranged in the second recess. The first and second roller elements may be preferably arranged coaxially and may have the same radius. The second roller unit may comprise a third roller element and a fourth roller element. The third roller element may be arranged in the first recess and the fourth roller element may be arranged in the second recess. The third and fourth roller elements may be arranged coaxially and may have the same radius.

A further aspect of the present invention relates to a high lift assembly as has been described in the preceding paragraphs in relation to the wing. The high lift assembly may be in the form of a leading edge high lift assembly, or may be in the form of a trailing edge high lift assembly.

The high lift assembly comprises a high lift body, e.g. a leading edge slat or a trailing edge flap, and a connection assembly configured for movably connecting the high lift body to the main wing, such that the high lift body is movable relative to the main wing, such as between a retracted position and at least one extended position. The connection assembly comprises an elongate track that extends along a track longitudinal axis between a first end and a second end and has an intermediate portion between the first and second ends. As previously described in reference to the first aspect, the first end may correspond to a front end of the connection assembly (in which case the rear end would correspond to the second end, as is also the case with the first described aspect) or the first end may correspond to a rear end of the connection assembly (in which case the front end would correspond to the second end, as is also the case with the first described aspect).

According to the second aspect, the first end and/or the intermediate portion of the track is mounted to the high lift body, and the second end and/or the intermediate portion of the track is configured to be mounted to the main wing by a roller bearing, such that the track is movable along the track longitudinal axis. For example, the track may be moveable along a predefined path, e.g. a predefined path on the track longitudinal axis, such as between a stowed position when the high lift body is in the retracted position, and a deployed position when the high lift body is in the extended position.

Further according to the second aspect, the roller bearing comprises at least one roller unit that is configured to be mounted to the main wing and is rotatable about a roller rotation axis. The roller bearing has a first circumferential roller surface configured for engaging an engagement surface provided on the elongate track, for example on the intermediate and/or the end portion of the elongate track. The roller unit comprises an internal elastic bearing that allows the roller surface, when viewed in a cross section parallel to the roller rotation axis, to adapt its orientation or form.

The roller surface may have a convexly curved form that is without kinks, for example that is smooth and/or that is without abrupt changes in geometry resulting in ribs, dimples, or the like. The curvature radius may increase continuously to infinity, i.e. such that the roller surface is flat and/or parallel to the roller rotation axis.

A further aspect relates to a roller unit for the wing for an aircraft as has been previously described, or for the high lift assembly as previously described.

According to this aspect, the roller unit is configured to be mounted to the main wing rotatable about a roller rotation axis. The roller unit has a circumferential roller surface configured for engaging an engagement surface provided on the elongate track. The circumferential roller surface may be configured for engaging an engagement surface provided on the intermediate portion and/or the second end of the elongate track. The roller unit comprises an internal elastic bearing that allows the roller surface, when viewed in a cross section parallel to the roller rotation axis, to adapt its orientation or form.

As in previous aspects, the roller surface may have a convexly curved form that is without kinks, for example that is smooth and/or that is without abrupt changes in geometry resulting in ribs, dimples, or the like. The curvature radius may increase continuously to infinity, i.e. such that the roller surface is flat and/or parallel to the roller rotation axis.

Another aspect relates to an aircraft comprising a wing for an aircraft as described in any of the previous paragraphs, comprising a high lift assembly as described previously, and/or comprising a roller unit as previously described.

BRIEF DESCRIPTION OF THE DRAWINGS

FIGS. 8a-f show six cross-sections of a bearing and an engagement surface according to the present invention;

FIG. 10 is a cross-section of a further embodiment of a bearing under different levels of loading.

DETAILED DESCRIPTION

Figure 1:
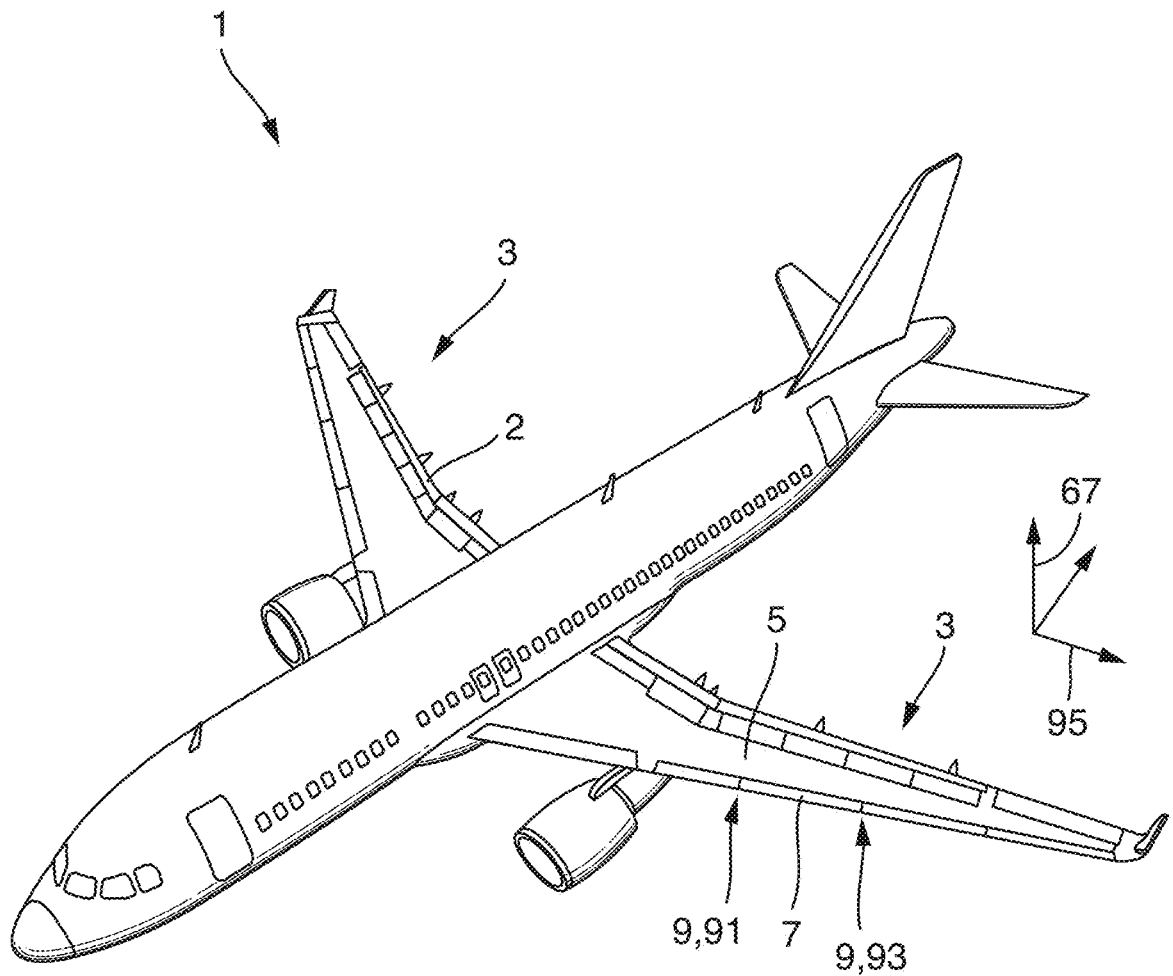
FIG. 1 is a perspective view of an aircraft, showing a wing of the aircraft.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting slat 7 to the main wing 5, it should also be understood that the connection assembly 9 may be used to connect a trailing edge flap 2 to the wing 5 of an aircraft.

Figure 2:
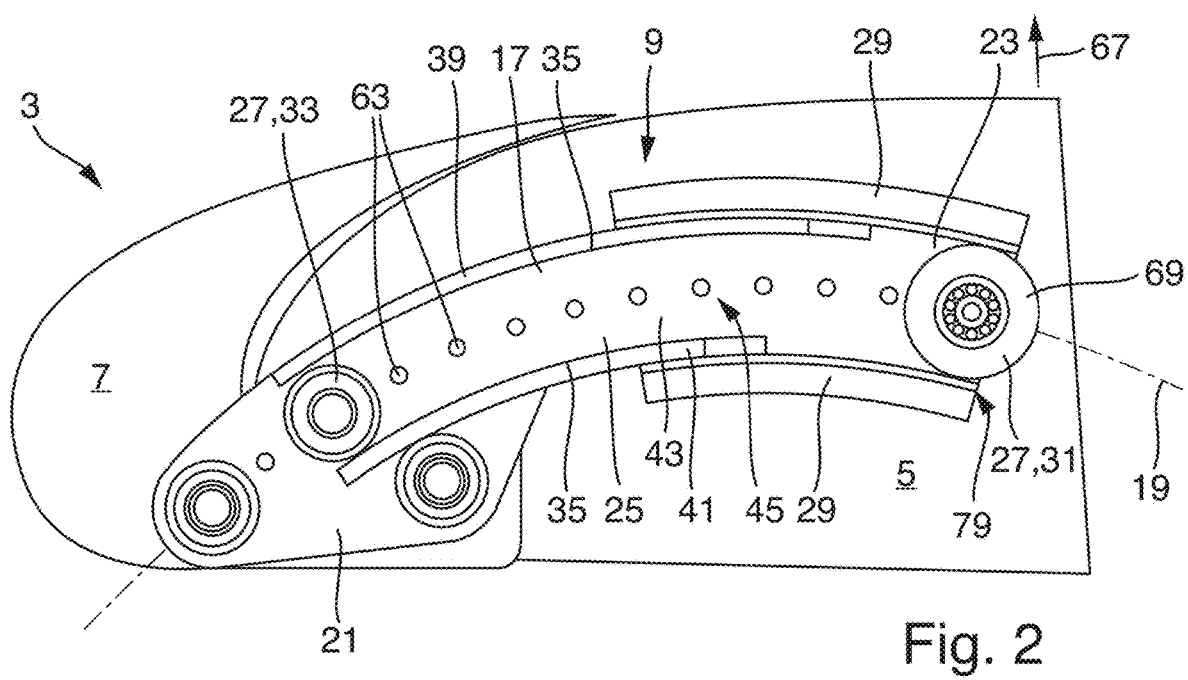
FIGS. 2-5 illustrates various views of connection assembly in an aircraft wing.

FIG. 2 shows a connection assembly 9 of a wing for an aircraft, which is configured to connect a slat to the main wing of an aircraft. The connection assembly 9 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position.

Figure 3:
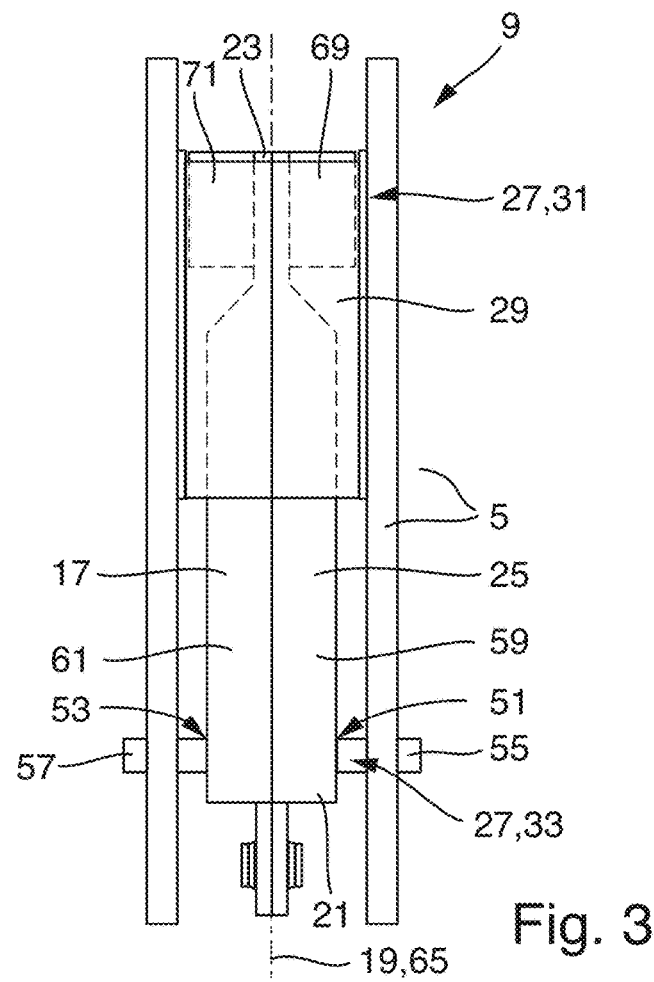
Figure 4:
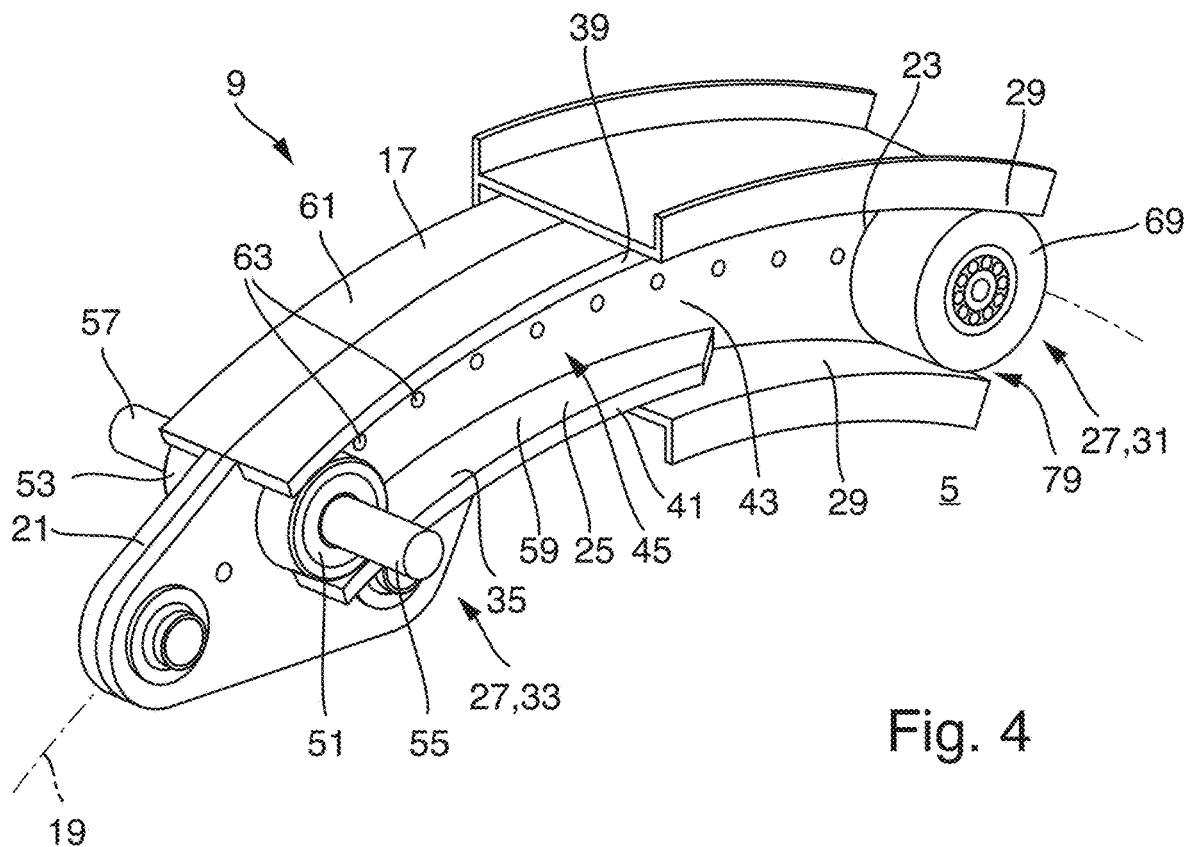
Figure 5:
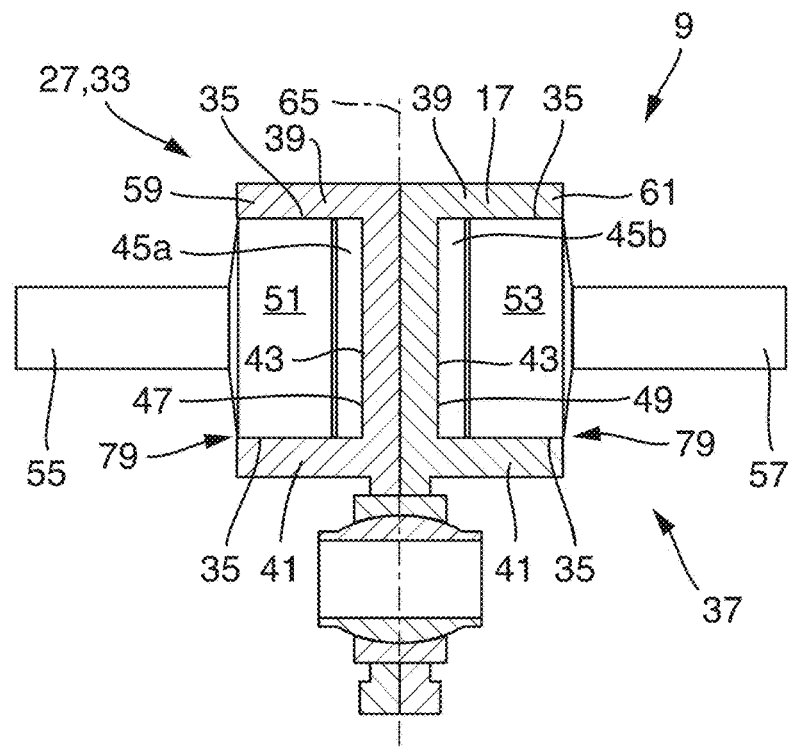

In FIG. 2, the connection assembly 9 comprises a slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the profile 37 of the slat track 17 provides a first recess 45a formed between the upper and lower flange portions 39, 41 at a first side 47 of the web portion 43, and a second recess 45b formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61.

Figure 6:
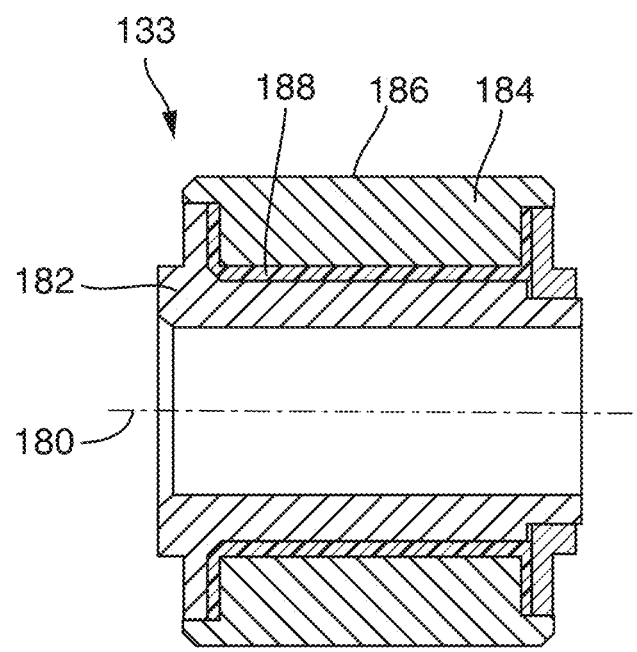
FIG. 6 is a cross-sectional view of a conventional roller bearing according to the prior art.

FIG. 6 illustrates an example of a conventional roller unit according to the prior art. In this case, the roller unit 133 may form part of an aircraft wing of the prior art, and may form part of a roller bearing according to the prior art.

The roller unit 133 comprises a static part 182 and a moveable part 184, where the moveable part 184 is rotatable about a roller rotation axis 180. The moveable part 184 comprises a roller surface 186 which is configured to contact an engagement surface so as to provide rolling contact between the roller unit 133 and the engagement surface, and in this case is generally cylindrical in shape such that the diameter of the moveable part 184 is substantially constant across the length thereof. The roller surface 186 is located on the curved cylindrical surface of the moveable part 184, and in this case is located between two chamfered axial ends of the moveable part 184. The roller unit additionally comprises a liner 188 positioned between the static part 182 and the moveable part 184. The liner 188 forms a gliding bearing between the statis part 182 and the moveable part 184, and is known to be formed of PTFE (Polytetrafluoroethylene).

The disadvantage of the roller unit 133 according to FIG. 6 is principally evident in cases where the roller rotation axis 180 is misaligned relative to the bearing surface. In such cases, rather than the load being spread over the entire length (or the majority of the length) of the roller surface 186, it is generally concentrated to one region (in particular, one side) of the roller surface 186. This then reduces the size of the contact region between the roller surface 186 and the bearing surface, such as on an elongate track of a connection assembly in a wing of an aircraft, thus greatly increasing the Hertzian contact stresses in both the roller surface 188 and the bearing surface. Increased Hertzian contact stresses has the undesirable effect of reducing the lifespan of both the roller unit 133 and the bearing surface.

Figure 7:
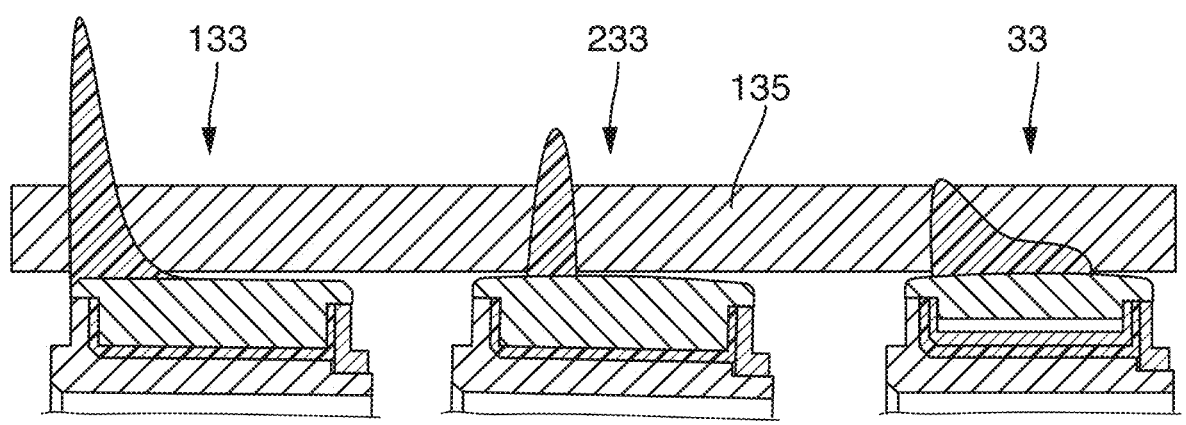
FIG. 7 shows the distribution of Hertzian contact stresses on the surface of three different roller bearings.

An illustration of contact stresses in three differing roller units 133, 233, 33 is illustrated in FIG. 7. In each case, the illustrated roller units 133, 233, 33 are oriented such that the roller rotation axis thereof is misaligned relative to the engagement surface 135. On the left side of FIG. 7 is illustrated the roller unit 133 as in FIG. 6, and as forms part of the state of the art. The middle roller unit 233 additionally forms part of the state of the art, although in this case the roller unit 233 is a crowned roller unit. In the case of the crowned roller unit 233, the diameter of the roller bearing is variable along its length, such that the roller surface is convex in shape in the longitudinal direction of the bearing, the convex surface having predetermined constant radius along the length thereof. Finally, the third roller unit 33 corresponds to the disclosure of the present invention, and will be described in more detail in the preceding paragraphs.

As is illustrated, the contact stresses in roller unit 133 are highly concentrated towards the extreme left end thereof, which is as a result of the misalignment of the roller rotation axis positioning the left side of the roller unit 133 closer to the engagement surface 135. The maximum contact stresses in roller unit 133 are somewhat reduced as a result of the convex surface of the crowned roller unit 233, although are still significant and concentrated on a relatively small region of the engagement surface 135. In contrast, the maximum contact stresses of the roller unit 33, which is in accordance with the present invention, are significantly lower, and as illustrated are also spread out over a larger contact region. The size of the contact region in each case is related to the area of the roller surface of each roller unit 133, 233, 33 that is in contact with the engagement surface 135.

In FIGS. 8a-c, a roller unit 33 according to the present invention is illustrated in three different configurations, while FIGS. 8d-f illustrate a further roller unit 33 according to the present invention, and in the same configurations as in FIGS. 8a-c. The first configuration, illustrated in FIG. 8a, shows the roller unit 33 having a roller rotation axis 80 that is aligned with an engagement surface 35. The engagement surface 35 may be, for example, located on the elongate track 17 of the previously described connection assembly 9.

As is illustrated in each of FIGS. 8a-c, the roller unit 33 comprises a static part 82 and a moveable part 84. In the context of the present invention, the static part 82 may be formed as a shaft mounted to the main wing 5 of the aircraft of FIG. 1. The static part 82 may be fixedly mounted to the main wing 5 so as to prevent translational movement between the static part 82 and the main wing 5. The moveable part 84 is formed as a sleeve that is arranged around (e.g. radially outwardly of) the static part 82, so as to be rotatable around the static part 82.

In order to facilitate rotation of the moveable part 84 around the static part 82, a liner 85 is provided therebetween. The liner 85 may be a low friction liner. The liner 85 may in the form of a gliding bearing and may facilitate rotational movement between the static and moveable parts 82, 84. The liner 85 may be made from any appropriate material, for example the liner may be or comprise a slide pad, a roller bearing, a lubricant a PTFE liner or the like. The liner 85 is located radially inwardly of the moveable part 84 and radially outwardly of the static part 82.

The roller unit 33 additionally comprises an internal elastic bearing 92. As is illustrated in FIGS. 8*a-c*, the internal elastic bearing 92 (e.g. an elastomeric bearing) may be located between a radially outer portion 84*a* of the moveable part 84 and a radially inner portion 84*b* of the moveable part 84. Therefore, in the example shown in FIGS. 8*a-c*, the moveable part 84 comprises the elastic bearing 92, as well as both the radially inner and outer portions 84*a,b*. The radially inner portion 84*b* may be in the form of a rotating ring, for example made from steel.

The configuration of the internal elastic bearing 92 in the roller unit 33 may permit the radially outer portion (e.g. the moveable part 84, an in particular, the radially outer element 84*a* thereof) to tilt about a tilt axis that is perpendicular to the roller rotation axis (e.g. when viewed in a cross-section that is parallel to the roller rotation axis). In the illustration of FIGS. 8*a-c*, such an axis extends perpendicularly out of the page. The elastic bearing 92 therefore permits the moveable part 84 (an in particular the roller surface 86) to adapt its orientation relative to the engagement surface 35 during engagement with the engagement surface 35. In FIGS. 8*d-f*, the same concept is illustrated, but with a roller surface 86 that is flat, e.g. a straight line, in the cross-section illustrated in FIGS. 8*d-f*. As can be seen, in FIG. 8*f* the roller surface 86 has been adapted in orientation such that the flat surface 86 tilts about a tilt axis and is fully in contact with the engagement surface 35 in the illustrated cross-sectional plane.

Returning to the examples of FIGS. 8*a-c*, the roller bearing 33 comprises a circumferential roller surface 86 that, viewed in a cross-section parallel to the roller rotation axis, is convexly curved in such a way that the curvature radius increases continuously from the lateral edges 94*a*, 94*b* to the centre of the roller surface. That is, the curvature radius of the roller surface 86 increases from one, or each, axial end and in an axial direction until the centre of the roller surface. In one example, the roller surface 86 is convexly curved such that the curvature radius increases continuously from the lateral edges so as to provide an even (e.g. flat, non-curved) section of the roller surface 86 that does not have any curvature, or for example which may be considered to have an infinitely great curvature radius. In this case, the even section begins laterally of the centre of the roller surface (e.g. offset from the centre of the roller surface 86 in the longitudinal direction).

The shape of the roller surface 86, as described in FIGS. 8*a-c*, permits the contact region between the engagement surface 35 and the roller surface 86 to be maximised across multiple configurations in the case of a misalignment between the roller rotation axis 80 and the engagement surface 35 (e.g. where the roller rotation axis 80 is not parallel to the engagement surface 35) by providing an increasingly large radius of curvature towards the centre of the roller surface 86. Further, upon contact between the roller surface 86 and the engagement surface 35, in the case of misalignment, the surface assists to generate a force that urges the roller surface into alignment with the engagement surface 35, for example such that the centre (e.g. the centre in the axial direction of the roller surface 86) is in contact with the engagement surface 35. In addition, the internal elastic bearing 92 permits the radially outer portion to tilt (e.g. rotate), thereby further permitting alignment of the roller surface 86 so as to maximise the contact region between the roller surface 86 and the engagement surface 35, thereby reducing the concentration of Hertzian contact stresses between the two.

In the example of FIG. 8*a*, the roller unit 33 is aligned with the engagement surface 35 (the axis 80 is parallel to the engagement surface 35) such that the centre of the roller surface 86 is in contact with the engagement surface 35, and the contact region between the two is large, thereby resulting in a relatively even distribution of Hertzian contact stresses. This is similarly the case in FIG. 8*d*.

In the example of FIG. 8*b*, the roller unit 33 is misaligned with the engagement surface 35, for example such that the roller rotation axis 80 and the engagement surface 35 are not parallel. In the case of FIG. 8*b*, there is contact between the roller surface 86 and the engagement surface 35, but the forces involved may be small. As such, there may be negligible or no deformation of the elastic bearing 92, resulting in the roller surface 86 maintaining some degree of misalignment relative to the engagement surface 35. However, due to the convex shape of the roller surface 86, a relatively large contact region may be preserved between the surfaces 86, 35. Given that the forces involved may also be small, the Hertzian forces may also remain within an acceptable level and concentration. Similarly, in FIG. 8*e*, there is negligible or no deformation of the elastic bearing 92, and the roller maintains some degree of misalignment relative to the engagement surface 35.

As the forces involved become greater (e.g. the forces directed perpendicular to the engagement surface 35) then the scenarios of FIGS. 8*c* and 8*f* become relevant. In these scenarios, the forces involved are great enough to significantly deform the elastic bearing 92. As is illustrated, the deformation of the elastic bearing 92 results in a tilting and realignment of the radially outer portion 84*a* relative to the engagement surface 35. In FIG. 8*c*, the convex shape with an increasing radius of curvature towards the centre of the roller surface 86 results in realignment of the radially outer portion 84*a* such that the centre of the roller surface 86 contacts the engagement surface 35, thus having the effect of spreading the forces along the contact region (as also shown on the right side of FIG. 7) and reducing concentrations of Hertzian stresses. In FIG. 8*f*, the flat surface 86 also functions to spread the forces along the contact region, rather than concentrate them on one point of the surface 86.

Figure 9:
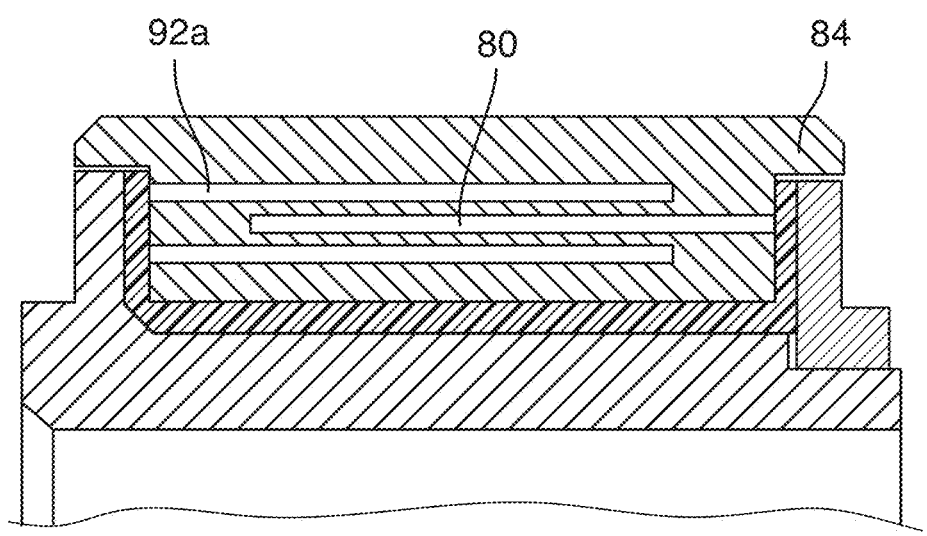
FIG. 9 is a cross-section of part of a further embodiment of a bearing.

In the illustration of FIG. 9, an alternative elastic bearing 92*a* is illustrated. Here, rather than having a bearing of an elastomeric material, the elastic bearing 92*a* is formed from the material of the bearing itself. In this case a plurality of slots 90 are provided in the moveable part 84. The slots are illustrated as running parallel to each other and to the roller rotation ais 80, and extending from both axial ends thereof. However, it should be noted that the slots 90 need not be parallel to each other, and/or need not be parallel to the roller rotation axis 80. The slots 90 may permit the moveable part 84 to deform when in contact with an engagement surface 85 as previously described. Although a bearing 92*a* with a flat surface has been illustrated, it should also be noted that a bearing having a convexly curved surface would also be conceivable.

FIG. 1*o* provides an illustration of yet another alternative elastic bearing 92*b*. In this case, the static part 82 comprises the elastic bearing 92*b*, which connects the roller unit 33 to an aircraft wing 3. The static part 82 here comprises a shaft, which may be a bolt, rod, or the like, that connects the roller unit 33 to the wing 3, e.g. that connects the moveable part 84 and optionally a connector between the moveable part 84 and the shaft to the wing. The connector may function to permit stable rotation of the moveable part 84, while also engaging the shaft. Two examples are illustrated in FIG. 10. In a first (upper) example, the elastic bearing 92*b* is illustrated in a non-deformed state. In a second (lower) example, the elastic bearing 92*b* is illustrated in an elastically deformed state.

In both examples, the moveable part 84 of the bearing 33 is in contact with the elongate track 35. In the first example, the loading between the bearing 33 and the elongate track 35 is relatively low, such that elastic deformation of the elastic bearing 92*b* is negligible. As such, the roller unit 33, the axis of which is misaligned relative to the elongate track 35, contacts the elongate track 35 at a relatively small contact region 96. In the second example, the loading between the bearing 33 and the elongate track 35 is increased such that the load transferred to the elastic bearing 92*b* (e.g. in the form of a bending moment) is sufficient to cause bending and elastic deformation thereof. As such, the roller unit 33 is permitted to realign itself relative to the elongate track 35 and the contact region 96 between the roller unit 33 and the elongate track 35 is increased, thus spreading the concentration of forces, similar to as illustrated in FIG. 7.

The invention claimed is:

1. A wing for an aircraft, comprising:
a main wing; and
a high lift assembly comprising:
   a high lift body; and
   a connection assembly movably connecting the high lift body to the main wing, such that the high lift body is movable between a retracted position and at least one extended position,
   wherein the connection assembly comprises an elongate track that extends along a track longitudinal axis between a first end and a second end and has an intermediate portion between the first and second ends,
   wherein the first end and/or the intermediate portion of the track is mounted to the high lift body,
   wherein the second end and/or the intermediate portion of the track is mounted to the main wing by a roller bearing such that the track is movable along the track longitudinal axis,
   wherein the roller bearing comprises at least one roller unit mounted to the main wing rotatable about a roller rotation axis, and having a circumferential roller surface configured to engage an engagement surface provided at the track,
   wherein
   the roller unit comprises an internal elastic bearing that allows the circumferential roller surface, when viewed in a cross section parallel to the roller rotation axis, to adapt its orientation relative to the engagement surface.

2. The wing according to claim 1, wherein the roller surface, when viewed in a cross section parallel to the roller rotation axis, has a form that is convexly curved in such a way that from lateral edges towards a centre of the roller surface a curvature radius increases continuously.

3. The wing according to claim 1, wherein the roller surface, when viewed in a cross section parallel to the roller rotation axis, is convexly curved in such a way that a curvature radius increases continuously from lateral edges up to a centre of the roller surface.

4. The wing according to claim 1, wherein the roller surface, when viewed in a cross section parallel to the roller rotation axis, is convexly curved in such a way that a curvature radius increases continuously from lateral edges up to an even section with no curvature that begins laterally of a centre of the roller surface.

5. The wing according to claim 1, wherein the roller unit comprises a radially outer portion and a radially inner portion, wherein the elastic bearing is arranged between the radially outer and inner portions, so that the radially outer portion can be tilted about a tilt axis perpendicular to the roller rotation axis.

6. The wing according to claim 1, wherein the roller unit comprises a static part and a movable part, wherein the static part comprises a shaft mounted to the main wing, and wherein the movable part comprises a sleeve arranged rotatably around the shaft.

7. The wing according to claim 6, wherein the movable part comprises the radially outer portion and the radially inner portion.

8. The wing according to claim 6, wherein the movable part is rotatably supported around the static part by a low friction liner arranged between the static part and the radially inner portion of the movable part.

9. The wing according to claim 6, wherein the elastic bearing is formed by the roller unit comprising one or more slots provided in the movable part and extending in parallel to the roller rotation axis.

10. The wing according to claim 1, wherein the roller unit is a first roller unit and wherein the roller bearing comprises a second roller unit spaced from the first roller unit along the track longitudinal axis.

11. The wing according to claim 1, wherein the track has a profile comprising an upper flange portion, a lower flange portion and at least one web portion connecting upper and lower flange portions,
   wherein the roller unit is arranged in a recess between upper and lower flange portions and engages the engagement surface provided at the upper flange portion and/or at the lower flange portion.

12. The wing according to claim 6, wherein the static part comprises the elastic bearing.

13. A high lift assembly for a wing for an aircraft,
the high lift assembly comprising
   a high lift body; and
   a connection assembly configured for movably connecting the high lift body to the main wing, such that the high lift body is movable between a retracted position and at least one extended position,
   wherein the connection assembly comprises an elongate track that extends along a track longitudinal axis between a first end and a second end and has an intermediate portion between the first and second ends,
   wherein the first end and/or the intermediate portion of the track is mounted to the high lift body,
   wherein the second end and/or the intermediate portion of the track is configured to be mounted to the main wing by a roller bearing such that the track is movable along the track longitudinal axis,
   wherein the roller bearing comprises at least one roller unit configured to be mounted to the main wing rotatable about a roller rotation axis, and having a circumferential roller surface configured for engaging an engagement surface provided at the track,
   wherein
   the roller unit comprises an internal elastic bearing that allows the roller surface, when viewed in a cross section parallel to the roller rotation axis, to adapt its orientation relative to the engagement surface.

14. A roller unit for the wing according to claim 1,
wherein the roller unit is configured to be mounted to the main wing rotatable about the roller rotation axis,
wherein the roller unit has the circumferential roller surface configured for engaging the engagement surface provided at the track, and
wherein the roller unit comprises the internal elastic bearing that allows the roller surface, when viewed in a cross section parallel to the roller rotation axis, to adapt its orientation relative to the engagement surface.

15. An aircraft comprising a wing according to claim 1.

16. An aircraft comprising a high lift assembly according to claim 13.

17. An aircraft comprising a roller unit according to claim 14.

* * * * *